Oct. 12, 1948.  W. A. HAINES, JR  2,451,083

LATHER MAKING MACHINE

Filed Sept. 17, 1945

INVENTOR.
WILLIAM A. HAINES
BY
Attorney

Patented Oct. 12, 1948

2,451,083

UNITED STATES PATENT OFFICE 2,451,083

LATHER MAKING MACHINE

William A. Haines, Jr., Glendale, Calif.

Application September 17, 1945, Serial No. 616,934

4 Claims. (Cl. 259—9)

This invention relates in general to machines for making lather or foam, or for beating eggs, whipping eggs or other materials, and an object is to provide a container preferably arranged with a compartment for holding a supply of saponaceous material for making lather or other material desired to be beaten or whipped by the mixture of air therewith, and having a second compartment designed to hold a small volume of material which is subject to the action of an impeller disposed at a point remote from the major volume of material and is formed with resilient blades or vanes which, when rotated, will afford pockets of gradually variable volume whereby quantities of the material are aerated as the impeller is rotated.

An object is to provide an inclined partition in the container which separates a shallow volume of material thereabove from the main body therebelow, and in which one or more orifices are provided at points above the desired level of a quantity of material to be treated, so that by merely tilting the container, or by the use of a metering device a quantity of material may be transferred from one to the other compartment, either before or during the operation of the device.

A further object is to provide a cylinder or chamber intermediately formed between the upper and lower compartments which is open to the upper compartment but closed to the lower compartment, and in which the impeller is rotatably mounted for mixing air and material from the upper compartment in requisite proportions to form a lather, emulsion, foam or other aerated mixture.

Other objects include the provision of a motor for operating the impeller, a cover detachably held on the container so that a supply of material may be inserted as desired and withal a compact unit preferably of transparent material so that the operation and results thereof are at all times visible.

Other objects may appear as the description progresses.

I have shown a preferred form of unit with minor modifications in the accompanying drawing which, however, may be susceptible of still further changes, within the scope of the appended claims, without departing from the spirit of my invention.

Figures 1, 4, 5:
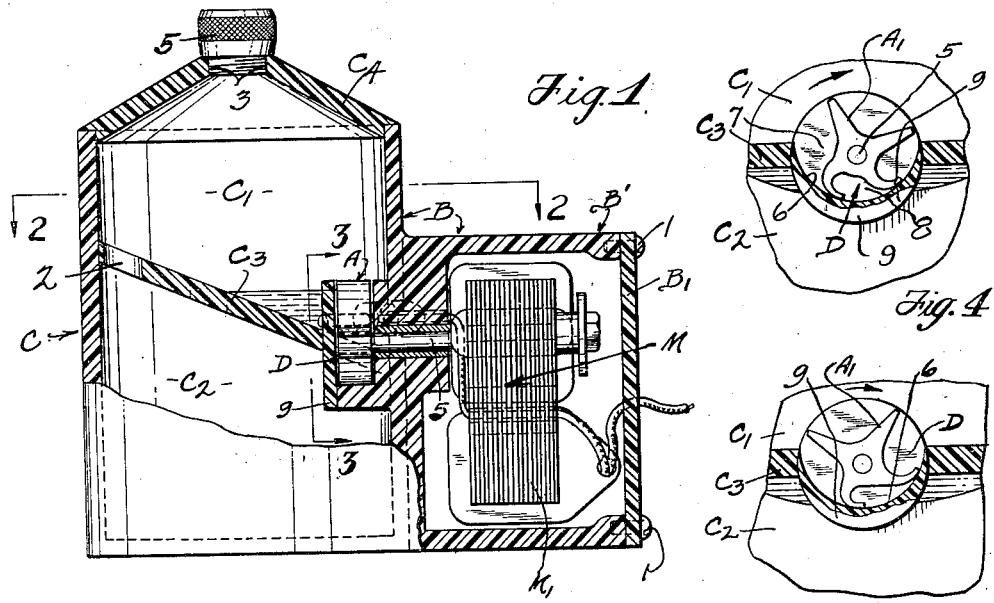
Fig. 1 is a sectional elevation.
Figs. 4 and 5 are fragmentary sections showing the impeller in different positions during the operation thereof with respect to one form of chamber in which it is operatively supported.
Figures 2, 3:
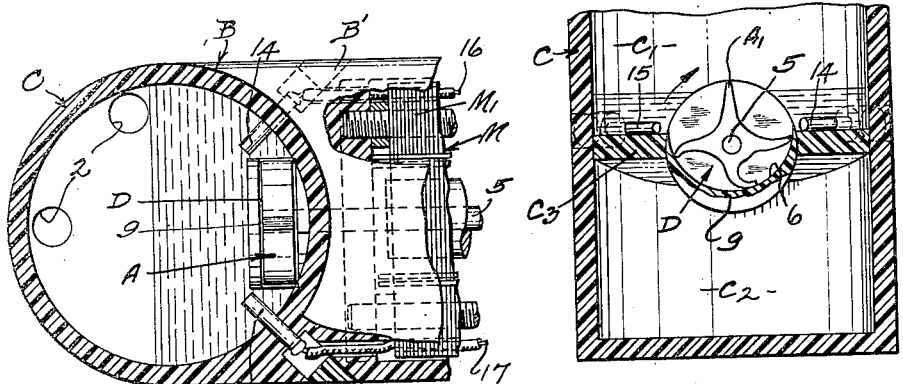
Fig. 2 is a sectional plan on line 2—2 of Fig. 1.
Fig. 3 is a sectional elevation on line 3—3 of Fig. 1.

I prefer to form the unit as shown in Figs. 1 and 2 which illustrate an integral body B, of glass or plastic material having an upright container C and a laterally or otherwise disposed portion B' adapted to house and support a motor M, portion B' being provided with a cover plate $B_1$ attached by means of screws 1 to the end of the portion.

Container C is subdivided into two chambers $C_1$ and $C_2$ by means of a partition $C_3$ which inclines upwardly from right to left, as shown in Fig. 1, and has one or more orifices 2 near its highest point for affording communication between chambers $C_1$ and $C_2$ or any other means for transferring the liquid from chamber $C_2$ to chamber $C_1$ when required. A cover $C_4$ is supported on the top of container C for closing chamber $C_1$ and for affording access to the container for inserting and removing the contents of the container at will. Thus, a saponaceous liquid or other fluidic material when poured into container C with the cover $C_4$ removed, or through a filling aperture 3, which is normally closed by a plug 5, will flow from chamber $C_1$ through orifices 2 into the lower chamber $C_2$ except for such relatively small quantity thereof as may be desired to be retained in chamber $C_1$ to the approximate level shown in Fig. 1. Otherwise, by tilting the body any desired quantity of material from chamber $C_2$ may be supplied to chamber $C_1$ through the orifices 2. Partition $C_3$ may be stationary or removably supported for the purpose of facilitating the cleaning of the lower chamber $C_2$. If desired, a separate filling aperture 3 and plug 5 may be provided for chamber $C_2$.

Figures 6, 7:
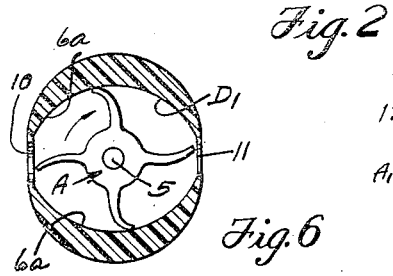
Figs. 6 and 7 are sectional views of two other modifications of chambered mountings for the impeller.

An impeller A is mounted in a chamber D, $D_1$ or $D_2$, as shown in Figs. 4, 6 and 7, respectively, said chamber being open at one or more points to chamber $C_1$ and disposed at the lowermost points of partition $C_3$. Thus, as the impeller rotates in its chamber it will draw liquid, gas or air in variable proportions and throughout successive stages from chamber $C_1$ and discharge the aerated products back into chamber $C_1$.

Impeller A is rotatably connected with a spindle 5 of motor M and is formed with a plurality of flexible or resilient blades or vanes $A_1$ so that when the axis 5 of the spindle is eccentric relative to the arc or curve 6 (Figs. 4 and 5) of chamber D, the vanes A₁ will be necessarily flexed and deformed as they traverse the curved surface 6, said curved surface may be formed with progressively different shapes so as to provide a regular or an irregular curved surface of circular, elliptical, parabolic or hyperbolic form, or combination thereof. Thus, the pockets or spaces will be of variable volume or capacity as the vanes A₁ are rotated, thereby inducing a flow of liquid and gas from chamber C₁ in variable proportions to the pockets, successively, as the impeller is rotated and its vanes traverse the wall as at 6 or 6a of the chamber D, D₁ or D₂. The impeller may be made entirely of rubber or of metal with the vanes A₁ sufficiently thin or otherwise and sufficiently flexible and resilient; or said impeller may have a metal body with suitably hinged vanes so as to correspondingly vary the capacity and volume of the pockets during the rotation of the impeller.

As shown in Figs. 1, 3, 4, and 5, the chamber D may be bounded and closed on one side by a circular or semi-circular disc 9 which separates chamber D from chamber C₂ and also partially from chamber C₁. As shown in Fig. 6, an impeller chamber D₁ may be formed with opposed curved surfaces 6a—6a, and inlet and outlet orifices 10 and 11, respectively. Or, as shown in Fig. 7, a linear chamber D₂ of similar cross sectional form may be provided, in which impeller A is mounted between an inlet 12 and an outlet 13.

In any case, the inlet and outlet of the impeller chamber are opened or closed to the chamber C₁ of the container C in order that the foam producing material and air may be moved through the impeller chamber and mixed for the purposes of thoroughly aerating the materials. As the successive quantities of the contained material are treated, the products are discharged from opening 3 or from chamber C₁ by removing the cover C₄. Then, by tilting the container a fresh supply of material is provided in chamber C₁ preparatory to a subsequent foam making operation.

It is preferable to heat the material contained in chamber C₁ and for such purpose I provide a pair of electrodes 14 and 15 which may be located as shown or more closely spaced, if desired, and are connected, respectively, with wires 16 and 17 leading from the field coil M₁ of motor M, either in series or parallel, as may be desired, but in any case so arranged that when motor M is energized the circuit of the electrodes will be completed by reason of the submergence of the electrodes in the material which acts as an electrolyte. It is obvious that the heating of the material, especially when forming a lather, expedites the aerating operations, but when the apparatus is used for whipping or beating food products, the heating elements may be disconnected or omitted, as will readily appear, by the introduction into the circuit of the electrodes of a suitable switch not herein shown.

In operation, as for the purpose of producing lather, for instance, a suitable saponaceous material is inserted through the filler cap 5 into chamber C₁ from which it will flow to the lower chamber C₂ through orifices 2. Enough of the material is left in chamber C₁ to almost, if not quite completely, submerge the impeller A (Fig. 1). The motor M is started, with or without the heating electrodes connected, and the rotation of the impeller in its chamber D operates to induce a flow of air and a quantity of material from chamber C₁ into the pockets between the impeller vanes in variable proportions, depending upon the capacity and changing volume of the pockets. Additional air is free to leak into the chamber C₁ through the joint between cap 5 and the top of the chamber.

The vanes of the impeller A flex as they are rotated and correspondingly vary the volume of the pockets as the impeller rotates in its chamber D, D₁ or D₂. When each operation is completed the aerated products may be withdrawn from chamber C₁ through aperture 3 by removal of cover C₄.

In order to adapt the device to the employment of the impeller mountings shown in Figs. 6 and 7, it is obvious that the chamber D should be of a different form than is illustrated in Figs. 1 to 5, inclusive, so as to have means for affording communication between chamber C₁ and the respective chambers D₁ and D₂ at their inlets and outlets.

Partition C₃ is inclined so as to effect the return of the contents of chamber C₁ to the impeller A during operation of the mechanism to insure thorough aeration of said contents by said impeller A.

It is deemed necessary, for forming a suitable lather, to limit the quantity of saponaceous material in chamber C₁ for any single lather producing operation. Accordingly, the partition C₃ is so formed and arranged, and is provided with suitably placed orifices 2, as to provide a material receiving pockets of suitable size and disposition so that said material in the pocket tends to flow toward the impeller A. Preferably, the partition C₃ is arranged at an angle as shown so that the pocket (forming the lower portion of chamber C₁) serves to trap material passing through the orifices 2 from the chamber C₂ as the device is tilted or inverted. Upon restoration of the device to an upright condition, excess material will flow back to chamber C₂ leaving a suitable amount thereof in chamber C₁.

Measuring or controlling the volume of air in chamber C₁ is deemed unnecessary since, during the initial stages of agitation of the material in the chamber, large globules of air will become entrapped and be restrained for subsequent finer dispersion among the particles of the saponaceous material. The proper inclusion of air is achieved regardless of whether the cover C₄ is in place or not. However, the cover prevents splattering, undue overflow and premature drying of the material and is, therefore, desirable as part of the device.

The operation, in greater detail, is as follows:
Saponaceous material admixed with air flows naturally into the chamber D of the impeller to be picked up by the impeller blades successively and confined in pockets 8 formed between the blades and the curved surface 6 or 6a of the impeller unit. As the impeller A rotates, its blades transport a quantity of material from the intake side of the impeller unit, along said curved surface, and discharges said material at the opposite side of the impeller unit.

It will be noted that the pockets 8, successively, first become progressively smaller and then progressively larger. It follows, then, that the material in said pockets is progressively compressed and then progressively expanded. However, because the impeller blades are flexible or have an equivalent property, the pressure in the more confined pockets seeks to leak to adjacent lower pressure pockets. The leakage may occur between the flexed blades and the curved surface 6 or 6a as the case may be, or between the lateral faces of said blades and the associated lateral walls of the impeller housing. This leakage causes an attenuation of the saponaceous material breaking or dividing the same into extremely fine particles so as to cause a complete emulsification of said material and the included gas.

Since the change in volume of the pockets 8 is continuous and progressive from large to small and large again, the mentioned leakage from the higher pressure pocket occurs in the direction of both adjacent lower pressure pockets, causing a more rapid emulsification by turbulent flow between pockets.

Further, as an impeller blade traps a quantity of material in a pocket 8 at the intake of the impeller, said material is under little or no pressure. As the impeller rotates, the volume of the material is decreased and the pressure increases until a midpoint in the impeller housing is reached where minimum volume under maximum pressure is attained. Continued rotation of the impeller toward the outlet side thereof, causes a progressive reversal of volume and pressure. However, at the mentioned midpoint, the change of pressure in the pockets 8 from high to a lower pressure, sets up an additional turbulence between said pockets, since a pocket 8 which was receiving leakage material now leaks material to adjacent lower pressure pockets, and vice versa.

The leakage provided for in this structure is not accidental but is intentional and the impeller unit is designed to obtain the operation set forth.

The essentials of the invention have been disclosed without reference to other attending devices which may be embodied in the device. Such pre-agitating means may be designed to feed the impeller forcibly to hasten emulsification. Other variations and additions may well be made.

From the foregoing description it will be apparent that the form of the impeller chamber D and the flexibility of the impeller blades A₁ effects during the rotation of the impeller successive and progressive changes in the form and capacity of the pockets between the blades which serve to create correspondingly variable pressures in the pockets and also generates a degree of turbulence during a process of mixation of air and liquid. Actually the design of the impeller and the wall of the chamber in which it rotates may be such that leakage may occur around the ends of the blades for the purpose of occasioning or increasing the turbulence thus created.

As shown in Fig. 1 when the blades A₁ reach successive positions above the level of partition C₃ they assume substantially radial positions and while they move through the volume of fluid in chamber C₁ they are not intended to any degree whip the material in said chamber, but the material will readily flow into and fill successive pockets between the blades and be expelled back into the chamber C₁ as lather.

It is necessary to measure the material placed in chamber C₁ in each batch uniformly so that correspondingly uniform results may be obtained, and the sloping partition C₃ serves to accomplish such a result by reason of the position of the filling apertures 2 and the impeller chamber D. It is obvious that my apparatus may be designed so as to expel the products thereof to points externally of chamber C₁ instead of back into said chamber, in which event the lather would be collected by another chamber or receptacle.

The forms of apparatus shown in Figs. 6 and 7 may be employed as continuous flow whipping machines, either arranged singly or in successive units, and in such case the rate of flow of materials and the impeller speeds will determine the character of the product.

The foregoing is intended as descriptive of the present form of the invention. Since many changes therein can be made within the spirit and scope of the invention, I intend to reserve the rights to such variations as may fall within the scope of the invention as claimed.

I claim:

1. In a device of the character described, the combination of: a container formed with an upper and a lower compartment arranged, respectively, to hold a minor and a major quantity of liquid and in communication with each other, a chamber depending from the bottom of the upper compartment and in communication therewith at spaced points but not in communication with the lower compartment except through the upper compartment, and an impeller rotatably mounted in said chamber for inducing a flow of liquid and air therethrough and for discharging the same therefrom into the upper compartment during the rotation of the impeller, said upper chamber having an inclined bottom formed with means at its uppermost point for affording communication with the lower compartment and said impeller chamber being positioned at the lowest point thereof.

2. In a device of the character described, the combination of: a container formed with an upper and a lower compartment arranged, respectively, to hold a major and a minor quantity of liquid and in communication with each other, a chamber depending from the bottom of the upper compartment and in communication therewith at spaced points but not in communication with the lower compartment except through the upper compartment, and an impeller rotatably mounted in said chamber for inducing a flow of liquid and air therethrough and for discharging the same therefrom into the upper compartment during the rotation of the impeller, a motor operatively connected with and for driving said impeller, and means connected in the circuit of said motor and including electrodes extended into the container for heating the contained liquid.

3. A lather making apparatus comprising: a container for a lather producing material formed with an apertured inclined partition above which measured quantities of material are adapted to be held, a rotatable impeller mounted at the lowermost point of said chamber and formed with flexible blades engageable throughout a portion of their revolutions with an arcuate wall and rotatable throughout the remainder of their orbits in said chamber, said wall being eccentric relative to the axis of said impeller, so that during a part of each revolution said blades will be progressively and successively flexed for correspondingly varying the capacity of the pockets between adjacent blades and creating variable pressures in said pockets and resultant surging of the liquid under higher pressure in said pockets around said vanes into pockets under lower pressure.

4. A lather making machine comprising: a container, an impeller chamber in communication at spaced points with said container, a rotatable impeller mounted in said impeller chamber and eccentric to portions of the inner surface of the impeller chamber between the points of communication of the chamber with the container and provided with a plurality of separate, spaced apart, flexible vanes adapted during their rotation to flex and thereby vary the capacity of the pockets between adjacent vanes and cause surging of the liquid trapped between said vanes and the wall of the impeller chamber around the vanes from pockets of reduced volume into pockets of larger volume, and means for inducing a flow of material from the container to and for discharging the same in aerated form from the impeller chamber for use.

WILLIAM A. HAINES, Jr.

REFERENCES CITED

The following references are of record in the file of this patent:

UNITED STATES PATENTS

| Number | Name | Date |
|---|---|---|
| 1,085,992 | Nilsson | Feb. 3, 1914 |
| 1,782,095 | Jensen | Nov. 18, 1930 |
| 1,937,100 | Stoddard | Nov. 28, 1933 |
| 2,052,569 | Jensen | Sept. 1, 1936 |

FOREIGN PATENTS

| Number | Country | Date |
|---|---|---|
| 5,453/31 | Australia | Feb. 12, 1932 |